United States Patent
Michaud et al.

(10) Patent No.: US 10,266,638 B2
(45) Date of Patent: Apr. 23, 2019

(54) POLYURETHANE PREPOLYMER WITH CYCLOCARBONATE END GROUPS OF LOW VISCOSITY AND THE USE THEREOF IN THE PRODUCTION OF A MULTI-COMPONENT ADHESIVE COMPOSITION

(71) Applicant: BOSTIK SA, La Plaine Saint-Denis (FR)

(72) Inventors: Guillaume Michaud, Compiegne (FR); Marjorie Pereira, Pontoise les Noyon (FR); Frederic Simon, Pont l'eveque (FR)

(73) Assignee: BOSTIK SA, La Plaine Saint-Denis (FR)

(*) Notice: Subject to any disclaimer, the term of this patent is extended or adjusted under 35 U.S.C. 154(b) by 269 days.

(21) Appl. No.: 15/127,224

(22) PCT Filed: Mar. 17, 2015

(86) PCT No.: PCT/FR2015/050637
§ 371 (c)(1),
(2) Date: Sep. 19, 2016

(87) PCT Pub. No.: WO2015/140457
PCT Pub. Date: Sep. 24, 2015

(65) Prior Publication Data
US 2017/0107321 A1    Apr. 20, 2017

(30) Foreign Application Priority Data
Mar. 19, 2014 (FR) .................... 14 52275

(51) Int. Cl.
| | |
|---|---|
| *C08G 18/78* | (2006.01) |
| *C08G 18/73* | (2006.01) |
| *C08G 18/28* | (2006.01) |
| *C08G 71/04* | (2006.01) |
| *C09J 175/04* | (2006.01) |
| *C09J 175/08* | (2006.01) |
| *C08G 18/10* | (2006.01) |
| *C08G 18/18* | (2006.01) |

(52) U.S. Cl.
CPC ......... *C08G 18/7837* (2013.01); *C08G 18/10* (2013.01); *C08G 18/1808* (2013.01); *C08G 18/284* (2013.01); *C08G 18/2815* (2013.01); *C08G 18/735* (2013.01); *C08G 71/04* (2013.01); *C09J 175/04* (2013.01); *C09J 175/08* (2013.01)

(58) Field of Classification Search
CPC .................................................. C08G 18/7837
See application file for complete search history.

(56) References Cited

U.S. PATENT DOCUMENTS

| | | | |
|---|---|---|---|
| 7,635,742 B2 | 12/2009 | Bernard | |
| 2003/0050424 A1 | 3/2003 | Bernard | |
| 2004/0073046 A1* | 4/2004 | Bernard | C07D 317/34 549/228 |
| 2007/0151666 A1* | 7/2007 | Moeller | C08G 71/00 156/327 |

FOREIGN PATENT DOCUMENTS

WO   00/20477 A1   4/2000

OTHER PUBLICATIONS

International Search Report dated Jul. 29, 2015 issued in corresponding PCT/FR2015/050637 application (2 pages).

\* cited by examiner

*Primary Examiner* — Daniel H Lee
(74) *Attorney, Agent, or Firm* — Millen, White, Zelano and Branigan, P.C.

(57) ABSTRACT

1) Specific polyurethane prepolymer (PP2) comprising at least two terminal (2-oxo-1,3-dioxolan-4-yl)methyl carbamate groups of low viscosity, its preparation process and its use in the manufacture of an adhesive composition.
2) Multicomponent system comprising, as first component (A), a composition comprising at least one such polyurethane prepolymer and, as second component (B), a composition comprising at least one curing agent having at least two primary amine ($-NH_2$) groups (B1).
3) Process for assembling materials employing the polyurethane prepolymer (PP2) according to the invention.

12 Claims, No Drawings

POLYURETHANE PREPOLYMER WITH CYCLOCARBONATE END GROUPS OF LOW VISCOSITY AND THE USE THEREOF IN THE PRODUCTION OF A MULTI-COMPONENT ADHESIVE COMPOSITION

The present invention relates to a polyurethane prepolymer having cyclocarbonate ((2-oxo-1,3-dioxolan-4-yl)methyl carbamate) end groups (PP2) of low viscosity, to its process of preparation and to its use in the manufacture of an adhesive composition.

The invention also relates to a multicomponent system comprising:

as first component (denoted component A), a composition comprising at least one polyurethane prepolymer having cyclocarbonate end groups (PP2) according to the invention and as second component (denoted component B), a composition comprising at least one curing agent comprising at least two primary amine $NH_2$ groups (B1).

The invention also relates to a process for assembling materials by adhesive bonding employing at least one polyurethane prepolymer having cyclocarbonate end groups (PP2) according to the invention.

Polyurethane-based adhesive (bonding or mastic) compositions, in particular in the form of multicomponent (generally two-component) systems in which the (two) reactive components necessary for the synthesis of the polyurethane are stored separately and mixed at the final moment before use of the adhesive composition, have been known for a long time.

In order for such a system to be correctly employed, the reactive components have to exhibit, on the one hand, a sufficient reactivity for the reaction to take place and to be implemented rapidly and, on the other hand, a viscosity suited to the mixing temperature, in order for the mixing to be easily implemented.

Conventionally, the synthesis of a polyurethane takes place by a polyaddition reaction between a polyol and a polyisocyanate.

However, polyisocyanates are compounds which are very sensitive in the presence of atmospheric moisture and require that appropriate measures be taken in order to prevent them from crosslinking prematurely and thus losing their reactivity during the handling and storage thereof (anhydrous conditions). Furthermore, some of these compounds, such as hexamethylene diisocyanate (HDI), isophorone diisocyanate (IPDI), toluene diisocyanate (TDI) or diphenylmethane diisocyanate (MDI), designated by the term of "diisocyanate monomer" in the remainder of the present patent application, are known as exhibiting toxicological risks to man and the environment and the most volatile can even generate toxic emissions.

The use and the storage of large amounts of such polyisocyanates is thus to be avoided as this requires the installation of complex and expensive safety devices suited to their use and their storage. In particular, it is desirable to avoid having recourse to such compounds during the final stage of synthesis of the polyurethane, in order to be able to make available to the public polyurethane-based adhesive compositions in the form of multicomponent systems which are more friendly to man and his environment and more stable in storage.

Patent application US 2007/0151666 discloses bonding or mastic compositions in the form of a two-component system which are obtained by mixing a component A, comprising at least two cyclocarbonate groups, with a component B, comprising at least two primary and/or secondary amine groups. The component A can be, inter alia, a prepolymer comprising ester or isocyanate groups functionalized by glycerol carbonate. In particular, the examples illustrate bonding or mastic compositions comprising a poly(hydroxyurethane-urethane) in which examples the component A is a polyurethane prepolymer or mixture of polyurethane prepolymers functionalized by glycerol carbonate.

Although these compositions exhibit the advantage of not using polyisocyanate during the mixing of the components A and B, they exhibit the disadvantage of employing a component A which is very viscous and indeed even solid at low temperature, which has either to be heated to a temperature of at least 125° C. liable to bring about thermal decomposition of the component, or be dissolved in a large amount of solvent (approximately 50% by weight of ethyl acetate in the examples) in order to be able to be sufficiently liquid for it to be possible to carry out the mixing with the component B. Failing that, there is a risk of the mixture setting solid and putting the production lines out of service. The use of such operating conditions is, however, not very desirable when it is wished to develop a preparation process which is economical, fast to carry out and friendly to man and the environment.

Poor mixing of the component A and B can also result in a product no longer exhibiting the desired properties and performance.

In addition, when it is desired to formulate compositions in the form of a kit which is transportable, practical and easy and rapid to employ on demand (Do It Yourself), the mixing of the reactants has to be able to be carried out as much as possible on restricted volumes and at low temperature, in particular at ambient temperature.

Thus, the bonding or mastic compositions in the form of a two-component system which exists based on poly(hydroxyurethane-urethane) are not entirely satisfactory and remain to be improved.

Consequently, there exists a need to make available polyurethane-based adhesive compositions which do not employ, on the one hand, polyisocyanate as end reactant for the synthesis of the polyurethane and in particular potentially toxic diisocyanate monomer in the final stage of synthesis of the polyurethane and which make it possible, on the other hand, to overcome the disadvantages of the prior art, while retaining satisfactory adhesive properties.

There also exists a need to formulate polyurethane-based compositions, available in the form of multicomponent and in particular two-component systems, which are easier to prepare in comparison with the prior art, for example at a mixing temperature of less than 95° C., preferably of less than or equal to 80° C., more preferably of less than or equal to 60° C. and better still close to ambient temperature (23° C.).

In particular, there exists a need to find compositions available in the form of multicomponent systems, in particular transportable systems (kits), which are friendly to man and the environment.

In particular, there exists a need to make available multicomponent systems, the use of which results in adhesive compositions, in particular bonding or mastic compositions, exhibiting satisfactory adhesive properties.

There also exists a need to make available multicomponent systems, the use of which results in adhesive compositions, in particular bonding or mastic compositions, exhibiting mechanical performances (for example, elongation and/or modulus performances) suited to the use of the adhesive composition.

In addition, there exists a need to develop a process for the preparation of such adhesive compositions which is economical, rapid to carry out and friendly to man and the environment. Desired in particular is a process for the preparation of such compositions which is not very expensive in energy and which does not employ a large amount of solvent, in contrast to the existing preparation processes.

Surprisingly, it has been found that the reaction of a specific polyurethane prepolymer having NCO end groups with glycerol carbonate, under specific conditions, makes it possible to obtain a polyurethane prepolymer having cyclocarbonate end groups which is not very viscous at low temperature, in particular at a temperature of less than 95° C., preferably of less than or equal to 80° C., more preferably of less than or equal to 60° C. and better still close to ambient temperature (ranging from 15 to 35° C.), thus making it possible to easily formulate under such conditions, in particular without the help of solvent, a composition exhibiting satisfactory adhesive properties which is available in the form of a multicomponent system.

A subject matter of the present invention is thus, firstly, a polyurethane prepolymer having (2-oxo-1,3-dioxolan-4-yl) methyl carbamate end groups (PP2) capable of being obtained by a preparation process according to the invention, as defined in any one of the sections below.

It has been observed that the polyurethane prepolymer having cyclocarbonate end groups (PP2) thus obtained by complete functionalization of the NCO groups of a compound (PP1) possessing at least two NCO groups and a unit of specific formula exhibits a viscosity, measured at the same temperature, which is lower in comparison with the polyurethane prepolymers functionalized by glycerol carbonate disclosed in the prior art, thus making it possible to easily and rapidly formulate, at a mixing temperature T3 of less than 95° C., preferably of less than or equal to 80° C., more preferably of less than or equal to 60° C. and better still close to ambient temperature (ranging from 15 to 35° C.), a solvent-free adhesive composition in the form of a multicomponent system.

Furthermore, it has been observed that, by using the polyurethane prepolymer having cyclocarbonate end groups (PP2) according to the invention, it was possible to manufacture solvent-free adhesive compositions exhibiting good wettability properties and good mechanical performances, suited to surface coating, and satisfactory adhesive properties for the assembling by adhesive bonding of at least two materials.

A subject matter of the present invention is, secondly, a process for the preparation of such a polyurethane prepolymer having (2-oxo-1,3-dioxolan-4-yl)methyl carbamate end groups (PP2) comprising a stage of polyaddition reaction (denoted E2):

of at least one compound (PP1) having at least two NCO groups and at least one divalent unit of formula (I'):

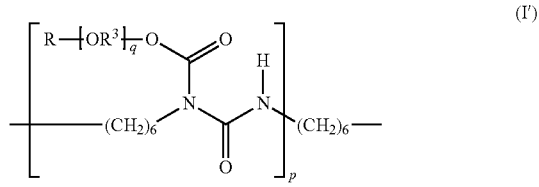

in which:
  p is an integer ranging from 1 to 2;
  q is an integer ranging from 0 to 9;
  R represents a saturated or unsaturated, linear or branched, cyclic or acyclic, hydrocarbon chain comprising from 1 to 20 carbon atoms;
  $R^3$ represents a saturated, linear or branched, divalent hydrocarbon group having from 2 to 4 carbon atoms;
with at least one glycerol carbonate, at a reaction temperature T2 of less than 95° C., under anhydrous conditions, in amounts of compound (PP1) and of glycerol carbonate resulting in an NCO/OH molar ratio, denoted r2, ranging from 0.8 to 1 and preferably from 0.85 to 1.0.

A subject matter of the present invention is, thirdly, a multicomponent system, preferably a solvent-free multicomponent system, comprising:
  as first component (denoted component A), a composition comprising at least one polyurethane prepolymer comprising cyclocarbonate end groups (PP2) according to the invention and
  as second component (denoted component B), a composition comprising at least one curing agent having at least two primary amine (—NH$_2$) groups (denoted aminated curing agent (B1)).

Another subject matter of the present invention is, fourthly, the use of the polyurethane prepolymer having cyclocarbonate end groups (PP2) according to the invention in the manufacture of an adhesive (bonding or mastic) composition, in particular a solvent-free adhesive composition.

Another subject matter of the present invention is, fifthly, a process for assembling materials by adhesive bonding employing at least one polyurethane prepolymer having cyclocarbonate end groups (PP2) according to the invention.

Other subject matters and characteristics of the present invention will become more clearly apparent on reading the description and examples.

In the present patent application, unless otherwise indicated:
  the amounts expressed in the form of percentages correspond to weight/weight percentages;
  cyclocarbonate group is intended to denote the (2-oxo-1, 3-dioxolan-4-yl)methyl carbamate group, that is to say a monovalent group corresponding to the following formula:

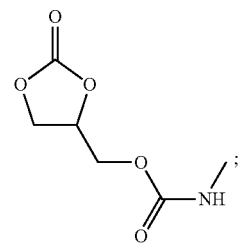

the number-average molar masses, expressed in grams per mole (g/mol), are determined by calculation by the analysis of the content of terminal (NCO, OH and cyclocarbonate) groups, expressed in milliequivalents per gram (meq/g), and the functionality (number of NCO, OH or cyclocarbonate functional groups per mole) of the compound under consideration (compound (PP1), polyether polyol, glycerol carbonate or polyurethane prepolymer having cyclocarbonate end groups (PP2) respectively);

"polyurethane prepolymer" denotes an intermediate in the synthesis of a polyurethane, corresponding to a polymer comprising, in its main chain, at least two urethane groups and at least two reactive functional groups (for example isocyanate or cyclocarbonate functional groups) allowing it to undergo at least one polyaddition reaction. Such a polyurethane prepolymer is capable of being obtained by a polyaddition reaction of at least one polyol with at least one polyisocyanate.

In particular, "polyurethane prepolymer having NCO end groups" denotes a polyurethane prepolymer comprising at least two isocyanate (NCO) groups, allowing it to undergo a polyaddition reaction in the presence of a cyclocarbonate (glycerol carbonate). Such a polyurethane prepolymer having NCO end groups is capable of being obtained by a polyaddition reaction of at least one polyol with a stoichiometric excess of polyisocyanate(s). This stoichiometric excess can be reflected by an NCO/OH molar ratio of strictly greater than 1, which corresponds to the molar ratio of the number of isocyanate (NCO) groups to the number of hydroxyl (OH) groups carried by the entities carrying such functional groups present in the reaction medium for the preparation of the polyurethane. In the process for the preparation of the polyurethane prepolymer having NCO end groups (compound PP1) of the invention, this ratio is denoted r1 and is defined more specifically subsequently.

In particular, "polyurethane prepolymer having cyclocarbonate end groups" denotes a polyurethane prepolymer comprising at least two cyclocarbonate groups, allowing it to undergo a polyaddition reaction in the presence of a polyamine. Such a polyurethane having cyclocarbonate end groups is obtained by complete functionalization of the isocyanate groups of a polyisocyanate using glycerol carbonate. The complete functionalization of the isocyanate groups by glycerol carbonate can be obtained by mixing the reactants in a stoichiometric amount or with a stoichiometric excess of glycerol carbonate. This is reflected by an NCO/OH molar ratio of less than or equal to 1. In the process for the preparation of the polyurethane prepolymer having cyclocarbonate end groups (PP2) of the invention, this ratio is denoted r2 and is defined more specifically subsequently;

"aminated curing agent (B1)" is intended to denote the curing agent comprising at least two primary amine $NH_2$ groups (B1) used according to the invention;

the hydroxyl number of an alcohol product (in particular polyether polyol or glycerol carbonate, which can be pure or in the form of a mixture) represents the number of hydroxyl functional groups per gram of product and is expressed, in the text of the present patent application, in the form of a equivalent number of milligrams of potassium hydroxide (KOH) used in the assaying of the hydroxyl functional groups per gram of product;

the measurement of viscosity at 23° C. can be carried out using a Brookfield viscometer according to the standard ISO 2555. Typically, the measurement carried out at 23° C. can be carried out using a Brookfield RVT viscometer with a spindle suited to the viscosity range and at a rotational speed of 20 revolutions per minute (rev/min);

the measurement of viscosity at 60° C. can be carried out using a Brookfield RVT viscometer coupled with a heating module of Thermosel type of the Brookfield brand, with a spindle suited to the viscosity range and at a rotational speed of 20 revolutions per minute;

the different embodiments described in the present patent application can be combined with one another.

A subject matter of the present invention is a process for the preparation of a polyurethane prepolymer having (2-oxo-1,3-dioxolan-4-yl)methyl carbamate end groups (PP2) comprising a stage of polyaddition reaction (denoted E2):

of at least one compound (PP1) having at least two NCO groups and at least one divalent unit of formula (I'):

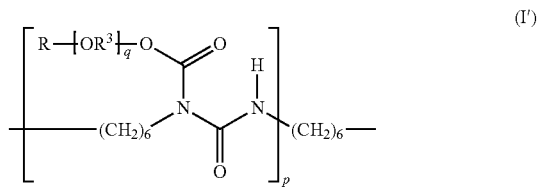

in which:
p is an integer ranging from 1 to 2;
q is an integer ranging from 0 to 9;
R represents a saturated or unsaturated, linear or branched, cyclic or acyclic, hydrocarbon chain comprising from 1 to 20 carbon atoms;
$R^3$ represents a saturated, linear or branched, divalent hydrocarbon group having from 2 to 4 carbon atoms;

with at least one glycerol carbonate, at a reaction temperature T2 of less than 95° C., under anhydrous conditions, in amounts of compound (PP1) and of glycerol carbonate resulting in an NCO/OH molar ratio, denoted r2, ranging from 0.8 to 1.

The compound(s) (PP1) used exhibit(s) a content of NCO groups preferably ranging from 0.5 to 15% by weight of said compound.

The compound(s) (PP1) used can be employed either pure or in the form of a composition essentially comprising said compound(s) and a low content of residual diisocyanate compound(s) resulting from the synthesis of said compound(s). In the latter case, the compound(s) (PP1) used is (are) such that the content of NCO groups present in said composition preferably ranges from 0.5 to 15% by weight, with respect to the weight of said composition.

The NCO/OH molar ratio, denoted r2 in the whole of the present patent application, corresponds to the molar ratio of the number of isocyanate groups to the number of hydroxyl groups respectively carried by the combined isocyanate(s) (compound(s) (PP1) and possibly the residual diisocyanate compound(s) resulting from the synthesis of said compound(s) (PP1)) and alcohol(s) (glycerol carbonate and possibly the alcohols present in the mixture, when glycerol carbonate is used in the form of a mixture) present in the reaction medium of stage E2.

On conclusion of stage E2, the polyurethane prepolymer having cyclocarbonate end groups (PP2) according to the invention which is obtained preferably exhibits from 0.1 to 5 milliequivalents of cyclocarbonate groups per gram of said prepolymer (PP2).

According to a first embodiment of the process for the preparation of the polyurethane prepolymer having (2-oxo-1,3-dioxolan-4-yl)methyl carbamate end groups (PP2) according to the invention, the compound(s) (PP1) having at least two NCO groups and at least one divalent unit of formula (I') as defined above is (are) preferably chosen from the hexamethylene diisocyanate (HDI) allophanate derivatives of formula (I):

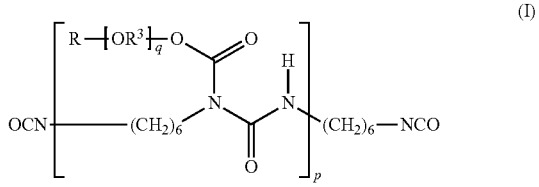 (I)

in which:
p is an integer ranging from 1 to 2;
q is an integer ranging from 0 to 9;
R represents a saturated or unsaturated, linear or branched, cyclic or acyclic, hydrocarbon chain comprising from 1 to 20 carbon atoms;
$R^3$ represents a saturated, linear or branched, divalent hydrocarbon group having from 2 to 4 carbon atoms.

Preferably, p, q, R and $R^3$ are chosen such that the HDI allophanate derivative of formula (I) comprises a percentage by weight of isocyanate group ranging from 12 to 14% by weight, with respect to the weight of said derivative.

More preferably:
p is an integer ranging from 1 to 2;
q is an integer ranging from 2 to 5;
R represents a saturated or unsaturated, linear or branched, cyclic or acyclic, hydrocarbon chain comprising from 6 to 14 carbon atoms;
$R^3$ represents a divalent propylene group.

The compound (PP1) which can be used according to the invention can be employed pure or in the form of a composition or mixture essentially containing at least a derivative of formula (I) and a low content of residual diisocyanate compound(s) resulting from the synthesis of said derivative. The content of residual diisocyanate compound(s) tolerated (corresponding to the HDI) is such that the use of said mixture does not have an impact on the final properties of the polyurethane prepolymer having (2-oxo-1,3-dioxolan-4-yl)methyl carbamate end groups (PP2).

In particular, the compound (PP1) which can be used according to the invention can be employed in the form of a composition comprising at least 99.5% by weight, preferably at least 99.8% by weight, of derivative(s) of formula (I) and less than 0.5% by weight, preferably less than 0.2% by weight, of HDI, with respect to the total weight of said composition.

Such a composition can be obtained, for example, by:
carbamation reaction ranging from 80 to 100° C. of a saturated or unsaturated and linear or branched acyclic monoalcohol comprising from 1 to 20 carbon atoms which is oxyalkylenated, the alkylene part of which is linear or branched and comprises from 1 to 4 carbon atoms, with a first HDI monomer in an NCO/OH molar ratio of greater than 2, advantageously of greater than 4 and preferably of greater than 8, then
allophanation reaction at a temperature ranging from 100 to 180° C., preferably in the vicinity of 140° C., of the carbamate compound obtained having a hydroxyl functional group with a second HDI monomer in an NCO/OH molar ratio of from 5 to 20, and
distillation of the unreacted HDI monomers, in order to obtain a reactant comprising less than 0.5% by weight of HDI, preferably less than 0.2% by weight of HDI.

Preferably, the content of NCO groups (also designated by "degree of NCO" and denoted % NCO) present in the composition of derivative(s) of formula (I) ranges from 12 to 14% by weight, with respect to the weight of said composition.

"Content of NCO groups present in the composition" (also designated by "degree of NCO", denoted % NCO) is understood to mean the content of isocyanate groups carried by the combined compounds present in the composition, namely the polyurethane prepolymer having NCO end groups formed and the other entities carrying isocyanate group(s) present, such as unreacted diisocyanate (HDI) monomers. This content of NCO groups can be calculated in a way well known to a person skilled in the art and is expressed as a percentage by weight, with respect to the total weight of the reaction medium.

The derivative of formula (I) which can be used to prepare the polyurethane prepolymer having cyclocarbonate end groups (PP2) according to the invention is sold in particular under the name of "Tolonate®" by Vencorex. Mention may in particular be made of "Tolonate® X FLO 100", corresponding to a composition comprising at least 99.5% by weight of HDI allophanate derivative of formula (I) and less than 0.5% by weight of HDI, with respect to the weight of said composition.

On conclusion of stage E2, the reaction medium is devoid of potentially toxic diisocyanate (HDI) monomers. The polyurethane prepolymer having cyclocarbonate end groups (PP2) according to the invention thus does not exhibit toxicological risks related to the presence of such monomers.

On conclusion of stage E2, the polyurethane prepolymer having cyclocarbonate end groups (PP2) according to the invention obtained in the context of this first embodiment preferably exhibits from 2 to 3 milliequivalents of cyclocarbonate groups per gram of said prepolymer (PP2).

According to a second embodiment of the process for the preparation of the polyurethane prepolymer having (2-oxo-1,3-dioxolan-4-yl)methyl carbamate end groups (PP2) according to the invention, the compound(s) (PP1) having at least two NCO groups and at least one divalent unit of formula (I') as defined above is (are) preferably chosen from the polyurethane prepolymers having NCO end groups (PP1) capable of being obtained by a polyaddition reaction (denoted stage E1):
(i) of a diisocyanate composition comprising at least one hexamethylene diisocyanate (HDI) allophanate derivative of formula (I) as defined above,
(ii) with at least one polyether polyol, at a reaction temperature T1 of less than 95° C., under anhydrous conditions and in amounts of diisocyanate(s) and of polyether polyol(s) resulting in an NCO/OH molar ratio, denoted r1, of strictly greater than 1 and preferably ranging from 1.6 to 1.9.

The NCO/OH molar ratio, denoted r1 in the whole of the present patent application, corresponds to the molar ratio of the number of isocyanate groups to the number of hydroxyl groups respectively carried by the combined isocyanate(s) (those of the composition of diisocyanates (i)) and alcohol(s) (polyether polyol(s)) present in the reaction medium of stage E1.

On conclusion of stage E1, the polyurethane prepolymer having NCO end groups (PP1) obtained is such that the content of NCO groups (also designated by "degree of NCO" and denoted % NCO) present in the reaction medium of stage E1 preferably ranges from 0.5 to 5.7%, more preferably from 0.7 to 3% and better still from 1 to 2.5%, with respect to the weight of the reaction medium of stage E1.

"Content of NCO groups present in the reaction medium" (also designated by "degree of NCO", denoted % NCO) is understood to mean the content of isocyanate groups carried by the combined compounds present in the reaction medium, namely the polyurethane prepolymer having NCO end groups (PP1) formed and the other entities carrying isocyanate group(s) present in the diisocyanate composition cited in (i) and which have not reacted. This content of NCO groups can be calculated in a way well known to a person skilled in the art and is expressed as a percentage by weight with respect to the total weight of the reaction medium.

On conclusion of stage E2, the reaction medium is devoid of potentially toxic diisocyanate monomers (HDI, IPDI, TDI, MDI). The polyurethane prepolymer having cyclocarbonate end groups (PP2) according to the invention thus does not exhibit toxicological risks related to the presence of such monomers.

On conclusion of stage E2, the polyurethane prepolymer having cyclocarbonate end groups (PP2) according to the invention obtained in the context of this second embodiment preferably exhibits from 0.1 to 1.5 milliequivalent(s) of cyclocarbonate groups per gram of said prepolymer (PP2), more preferably from 0.15 to 1 milliequivalent of cyclocarbonate groups per gram of said prepolymer (PP2) and better still from 0.2 to 0.8 milliequivalent of cyclocarbonate groups per gram of said prepolymer (PP2).

The diisocyanate composition cited in (i) preferably comprises, in addition to the hexamethylene diisocyanate (HDI) allophanate derivative or derivatives of formula (I), at least one different diisocyanate chosen, for example, from IPDI, TDI, MDI and their mixture.

According to a preferred alternative form of this second embodiment of the process for the preparation of the polyurethane prepolymer having (2-oxo-1,3-dioxolan-4-yl)methyl carbamate end groups (PP2) according to the invention, the compound(s) (PP1) having at least two NCO groups is (are) preferably chosen from the polyurethane prepolymers having NCO end groups capable of being obtained by a polyaddition reaction (denoted E1):
(i) of a diisocyanate composition consisting of at least one hexamethylene diisocyanate (HDI) allophanate derivative of formula (I) as defined above and optionally at least one diisocyanate chosen from:
  a1) isophorone diisocyanate (IPDI) (the percentage by weight of isocyanate group of which is equal to 38% by weight approximately, with respect to the weight of IPDI),
  a2) 2,4-toluene diisocyanate (2,4-TDI) (the percentage by weight of isocyanate group of which is equal to 48% by weight approximately, with respect to the weight of 2,4-TDI),
  a3) 2,4'-diphenylmethane diisocyanate (2,4'-MDI) (the percentage by weight of isocyanate group of which is equal to 34% by weight approximately, with respect to the weight of 2,4'-MDI),
(ii) with at least one polyether polyol, at a reaction temperature T1 of less than 95° C., under anhydrous conditions, in the presence or absence of a reaction catalyst and in amounts of diisocyanate(s) and of polyether polyol(s) resulting in an NCO/OH molar ratio r1 ranging from 1.6 to 1.9 and preferably ranging from 1.65 to 1.85.

The diisocyanate(s) cited in a2) and a3) which can be used in the diisocyanate composition (i) can be employed in the form of a mixture essentially containing said diisocyanate(s) and a low content of residual diisocyanate compound(s) (corresponding to the isomers of 2,4-TDI and of 2,4'-MDI respectively) resulting from the synthesis of said diisocyanate(s) cited in a2) and a3). The content of residual diisocyanate compound(s) tolerated is such that the use of said mixture does not have an impact on the final properties of the polyurethane prepolymer comprising (2-oxo-1,3-dioxolan-4-yl)methyl carbamate end groups (PP2).

For example, the diisocyanate(s) cited in a2) and a3) which can be used in the diisocyanate composition (i) can be employed in the form of a mixture containing at least 99% by weight of diisocyanate(s) and less than 1% by weight of residual diisocyanate compound(s), preferably in the form of a mixture containing at least 99.5% by weight of diisocyanate(s) and less than 0.5% by weight of residual diisocyanate compound(s), more preferably in the form of a mixture containing at least 99.8% by weight of diisocyanate(s) and less than 0.2% by weight of residual diisocyanate compound(s), with respect to the weight of said mixture.

Preferably, the content of residual diisocyanate compound(s) is such that the content by weight of isocyanate group in said mixture remains approximately equal to that indicated above with respect to the weight of the diisocyanate a2) and a3) alone.

Thus, the 2,4-TDI as cited in a2) can be used in the form of a commercially available industrial TDI corresponding to a composition, the 2,4-TDI content of which is at least 99% by weight and preferably at least 99.5% by weight, with respect to the weight of said composition.

The 2,4'-MDI as cited in a3) can be used in the form of a commercially available industrial MDI corresponding to a composition, the 2,4'-MDI content of which is at least 99% by weight and preferably at least 99.5% by weight, with respect to the weight of said composition.

The diisocyanate(s) cited in a1), a2) and a3) which can be used in the diisocyanate composition (i) to prepare the compound (PP1) used according to the invention are widely available commercially. Mention may be made, by way of example, of "Scuranate® T100", sold by Vencorex, corresponding to a 2,4-TDI with a purity of greater than 99% by weight, or "Desmodur® I", sold by Bayer, corresponding to an IPDI.

The polyether polyol(s) (ii) which can be used to prepare the polyurethane prepolymer having NCO end groups (PP1) used according to the invention can be chosen from those for which the number-average molar mass ranges from 200 to 20 000 g/mol, preferably from 250 to 18 000 g/mol and better still from 2000 to 12 000 g/mol.

Preferably, their hydroxyl functionality ranges from 2 to 3. The hydroxyl functionality is the mean number of hydroxyl functional groups per mole of polyether polyol.

Preferably, the polyether polyol(s) which can be used according to the invention exhibit(s) a hydroxyl number (OHN) ranging from 9 to 105 mg KOH/g, preferably from 13 to 90 mg KOH/g, more preferably from 25 to 70 mg KOH/g and better still from 40 to 65 mg KOH/g.

The polyether polyol(s) (ii) which can be used according to the invention is (are) preferably chosen from polyoxyalkylene polyols, the linear or branched alkylene part of which comprises from 1 to 4 carbon atoms and preferably from 2 to 3 carbon atoms.

More preferably, the polyether polyol(s) (ii) which can be used according to the invention is (are) preferably chosen from polyoxyalkylene diols or polyoxyalkylene triols and better still polyoxyalkylene diols, the linear or branched alkylene part of which comprises from 1 to 4 carbon atoms, preferably from 2 to 3 carbon atoms, and the average molar mass of which ranges from 200 to 20 000 g/mol and preferably from 2000 to 12 000 g/mol.

Mention may be made, as examples of polyoxyalkylene diols or triols which can be used according to the invention, of:
- polyoxypropylene diols or triols (also denoted by polypropylene glycol (PPG) diols or triols) having an average molar mass ranging from 400 to 18 000 g/mol and preferably ranging from 400 to 4000 g/mol;
- polyoxyethylene diols or triols (also denoted by polyethylene glycol (PEG) diols or triols) having an average molar mass ranging from 400 to 18 000 g/mol and preferably ranging from 400 to 4000 g/mol;
- PPG/PEG copolymer diols or triols having an average molar mass ranging from 400 to 18 000 g/mol and preferably ranging from 400 to 4000 g/mol;
- polytetrahydrofuran (PolyTHF) diols or triols having an average molar mass ranging from 250 to 4000 g/mol; and their mixtures.

Preferably, the polyether polyol(s) which can be used is (are) chosen from polyoxypropylene diols or triols with a polydispersity index ranging from 1 to 1.4, in particular ranging from 1 to 1.3. This index corresponds to the ratio of the weight-average molar mass to the number-average molar mass of the polyether polyol (PI=Mw/Mn) which are determined by GPC.

The abovementioned polyether polyols are prepared conventionally and are widely available commercially. They can be obtained by polymerization of the corresponding alkylene oxide in the presence of a catalyst based on a double metal/cyanide complex.

Mention may be made, as examples of polyether diols, of the polyoxypropylene diols sold under the name "Acclaim®" by Bayer, such as "Acclaim® 12200", with a number-average molar mass in the vicinity of 11 335 g/mol and the hydroxyl number of which ranges from 9 to 11 mg KOH/g, "Acclaim® 8200", with a number-average molar mass in the vicinity of 8057 g/mol and the hydroxyl number of which ranges from 13 to 15 mg KOH/g, and "Acclaim® 4200", with a number-average molar mass in the vicinity of 4020 g/mol and the hydroxyl number of which ranges from 26.5 to 29.5 mg KOH/g, or else the polyoxypropylene diol sold under the name "Voranol P2000" by Dow, with a number-average molar mass in the vicinity of 2004 g/mol and the hydroxyl number of which is 56 mg KOH/g approximately.

Mention may be made, as examples of polyether triols, of the polyoxypropylene triol sold under the name "Voranol CP3355" by Dow, with a number-average molar mass in the vicinity of 3554 g/mol and the hydroxyl number of which ranges from 40 to 50 mg KOH/g.

The polyaddition reaction of stage E1 can be carried out in the presence or absence of at least one reaction catalyst.

The reaction catalyst(s) which can be used can be any catalyst known to a person skilled in the art for catalyzing the formation of polyurethane by reaction of at least one diisocyanate with at least one polyether polyol.

An amount ranging up to 0.3% by weight of catalyst(s), with respect to the weight of the reaction medium of stage E1, can be used. In particular, it is preferable to use from 0.02 to 0.2% by weight of catalyst(s), with respect to the weight of the reaction medium of stage E1.

The glycerol carbonate which can be used to prepare the polyurethane prepolymer having (2-oxo-1,3-dioxolan-4-yl) methyl carbamate end groups (PP2) according to the invention can be employed either pure or in the form of a glycerol carbonate mixture or composition containing at least 96% by weight of glycerol carbonate and at most 3% by weight of residual polyol compound(s) (glycerol) resulting from the synthesis of said glycerol carbonate. In the latter case, the content of residual polyol compound(s) (glycerol) resulting from the synthesis of said glycerol carbonate is such that the mean hydroxyl number of said glycerol carbonate composition ranges from 475 to 510 mg KOH/g of composition.

Such compounds are commercially available under the name of Jeffsol® Glycerine Carbonate from Huntsman.

The amount of compound (PP1) and of glycerol carbonate is such that the NCO/OH molar ratio, denoted r2, ranging from 0.8 to 1 and preferably from 0.85 to 1.0.

When the compound (PP1) used and/or the glycerol carbonate used is or are in the form of a composition or mixture essentially comprising said compound(s) (PP1) and/or glycerol carbonate respectively, as described above, the calculation of the ratio r2 takes into account, on the one hand, the NCO groups carried by the compound (PP1) but also the isocyanates possibly as a mixture with the compound(s) (PP1) and/or, on the other hand, the OH groups carried by the glycerol carbonate but also the residual polyol compound(s) (glycerol) possibly as a mixture with the glycerol carbonate.

According to a preferred embodiment of the process for the preparation of a polyurethane prepolymer having cyclocarbonate end groups (PP2) according to the invention, the process does not comprise a stage of purification of the intermediate reaction products or a stage of removal of solvent.

More preferably, said process does not comprise a stage consisting in adding one or more solvent(s) and/or plasticizer(s). Such a preparation process can thus be carried out without interruption, with very high production line rates on the industrial scale.

According to a more preferred embodiment of the process for the preparation of a polyurethane prepolymer comprising (2-oxo-1,3-dioxolan-4-yl)methyl carbamate end groups (PP2) according to the invention, the latter consists of a stage E2 optionally preceded by a stage E1, the stages E1 and E2 being as defined in any one of the preceding sections.

Another subject matter of the present invention is a polyurethane prepolymer having (2-oxo-1,3-dioxolan-4-yl) methyl carbamate end groups (PP2) capable of being obtained by a preparation process according to the invention as described in any one of the preceding sections.

According to a first embodiment of the polyurethane prepolymer having cyclocarbonate end groups (PP2) according to the invention, the latter preferably has a viscosity, measured at ambient temperature (23° C.), of less than or equal to 1500 Pa·s, more preferably of less than or equal to 600 Pa·s and better still of less than or equal to 400 Pa·s, making it possible to easily formulate an adhesive composition according to the invention, in particular without additional solvent.

According to a second embodiment of the polyurethane prepolymer having cyclocarbonate end groups (PP2) according to the invention, the latter preferably has a viscosity, measured at 60° C., of less than or equal to 50 Pa·s, more preferably of less than or equal to 40 Pa·s and better still of less than or equal to 30 Pa·s, making it possible to easily formulate an adhesive composition according to the invention, in particular without addition of solvent.

According to a preferred alternative form of these embodiments, the polyurethane prepolymer having cyclocarbonate end groups (PP2) has a viscosity, measured at ambient temperature (23° C.), of less than or equal to 600 Pa·s and a viscosity, measured at 60° C., of less than or equal to 40 Pa·s.

Another subject matter of the present invention is a multicomponent system, preferably a solvent-free multicomponent system, comprising at least:
- as first component (component A), a composition comprising at least one polyurethane prepolymer having cyclocarbonate end groups (PP2) according to the invention and
- as second component (component B), a composition comprising at least one curing agent having at least two primary amine (—NH$_2$) groups (B1).

The components of the multicomponent system are generally stored separately and are mixed at the time of use, at a mixing temperature T3, in order to form an adhesive composition intended to be applied to the surface of a material. The adhesive composition according to the invention thus obtained comprises at least one poly(hydroxyurethane-urethane) comprising at least two primary amine groups, said poly(hydroxyurethane-urethane) comprising at least two primary amine groups resulting from the reaction of the polyurethane prepolymer (PP2) and the aminated curing agent (B1).

The mixing of the components of the multicomponent system and in particular of components A and B can be carried out under anhydrous conditions.

Preferably, the amounts of polyurethane prepolymer(s) having cyclocarbonate end groups (PP2) and of aminated curing agent(s) (B1) present in the multicomponent system according to the invention result in a molar ratio of the number of cyclocarbonate groups to the number of primary amine groups, denoted r3, ranging from 0.5 to 1, in particular from 0.65 to 1 and more preferably from 0.8 to 1.

The molar ratio, denoted r3, in the whole of the present patent application corresponds to the molar ratio of the total number of cyclocarbonate groups present in the multicomponent system to the total number of primary amine groups present in the multicomponent system.

The use of such a ratio r3 makes it possible to obtain, by a polyaddition reaction between the polyurethane prepolymer having cyclocarbonate end groups (PP2) and the aminated curing agent(s) (B1), an adhesive composition comprising at least one poly(hydroxyurethane-urethane) comprising at least two primary amine groups according to the invention and exhibiting an improved mechanical performance.

The aminated curing agent(s) (B1) used according to the invention preferably has (have) a viscosity suited to the mixing temperature T3. The aminated curing agent(s) (B1) used according to the invention preferably has (have) a primary alkalinity ranging from 0.4 to 34 meq/g of aminated curing agent, more preferably from 3.0 to 34 meq/g of aminated curing agent.

The primary alkalinity is the number of primary amine NH$_2$ functional groups per gram of aminated curing agent (B1), said number being expressed in the form of milliequivalents of HCl (or milliequivalents of NH$_2$) used in the assaying of the amine functional groups, determined in a well-known way by titration.

The aminated curing agent(s) (B1) used according to the invention can be monomeric or polymeric compounds.

The aminated curing agent(s) (B1) used according to the invention can be chosen from saturated or unsaturated and linear, branched, cyclic or acyclic hydrocarbon compounds comprising at least two primary amine —NH$_2$ groups, the hydrocarbon chain between the —NH$_2$ (or advantageously —CH$_2$—NH$_2$) functional groups optionally being interrupted by one or more heteroatoms chosen from O, N or S and/or optionally interrupted by one or more divalent —NH— (secondary amine), —COO— (ester), —CONH— (amide), —NHCO— (carbamate), —C=N— (imine), —CO— (carbonyl) and —SO— (sulfoxide) groups, and exhibiting a primary alkalinity ranging from 0.4 to 34 meq/g of aminated curing agent, more preferably from 3.0 to 34 meq/g of aminated curing agent.

Mention may be made, as examples of such compounds, for example, of:
- alkylenepolyamines comprising at least two primary amine —NH$_2$ groups
- cycloalkylenepolyamines comprising at least two primary amine —NH$_2$ groups
- polyamines comprising both alkyl and cycloalkyl groups and comprising at least two primary amine —NH$_2$ groups
- polyetherpolyamines comprising at least two primary amine —NH$_2$ groups
- polyethyleneimines comprising at least two primary amine —NH$_2$ groups
- polypropyleneimines comprising at least two primary amine —NH$_2$ groups
- polyamidoamines comprising at least two primary amine —NH$_2$ groups.

Preferably, the aminated curing agent(s) (B1) used according to the invention has (have) two or three primary amine groups.

More preferably, the aminated curing agent(s) (B1) used according to the invention is (are) chosen from saturated and linear, branched, cyclic or acyclic hydrocarbon compounds comprising two or three primary amine —NH$_2$ groups, said compounds optionally being interrupted by one or more heteroatoms chosen from an oxygen —O— atom and a nitrogen —N— atom and/or one or more divalent secondary amine —NH— groups, said aminated curing agent(s) exhibiting a primary alkalinity ranging from 0.4 to 34 meq/g of aminated curing agent, more preferably from 3.0 to 34 meq/g of aminated curing agent.

Mention may be made, as examples of such compounds, for example, of:
- alkylenediamines and alkylenetriamines, respectively comprising two or three primary amine —NH$_2$ groups,
- cycloalkylenediamines and cycloalkylenetriamines, respectively comprising two or three primary amine —NH$_2$ groups,
- diamines and triamines comprising both alkyl and cycloalkyl groups, respectively comprising two or three primary amine —NH$_2$ groups,
- polyether diamines and polyether triamines, respectively comprising two or three primary amine —NH$_2$ groups,
- polyethyleneimines comprising two or three primary amine —NH$_2$ groups,
- polypropyleneimines comprising two or three primary amine —NH$_2$ groups,
- polyamidoamines comprising two or three primary amine —NH$_2$ groups.

More particularly, mention may be made of:

ethylenediamine (EDA), having a primary alkalinity of 33.28 meq/g:

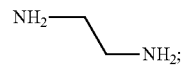

diethylenetriamine (DETA) having a primary alkalinity of 19.39 meq/g:

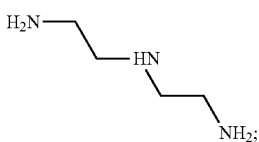

tris(2-aminoethyl)amine (TAEA) having a primary alkalinity of 20.52 meq/g:

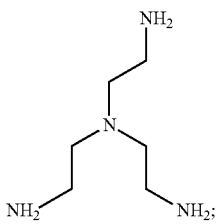

polyethyleneimines corresponding to the formulae below:

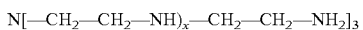

in which x is an integer such that the primary alkalinity ranges from 0.4 to 34 meq/g, more preferably from 3.0 to 34 meq/g;

polypropyleneimines corresponding to the formulae below:

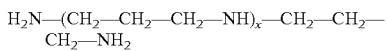

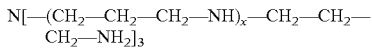

in which x is an integer such that the primary alkalinity ranges from 0.4 to 34 meq/g, more preferably from 3.0 to 34 meq/g;

poly(ethylene-propylene)imines corresponding to the formulae below:

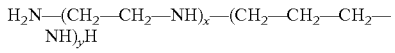

$N[-(CH_2-CH_2-NH)_x-(CH_2-CH_2-CH_2-NH)_y H]_3$ in which x and y are integers such that the primary alkalinity ranges from 0.4 to 34 meq/g, more preferably from 3.0 to 34 meq/g;

hexamethylenediamine (HMDA), having a primary alkalinity of 17.11 meq/g:

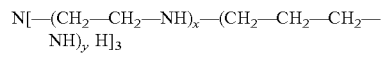

isophoronediamine (IPDA), having a primary alkalinity of 11.73 meq/g:

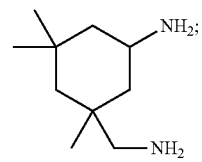

polyetherdiamines having a primary alkalinity ranging from 7.58 to 19.23 meq/g and corresponding to the formula below:

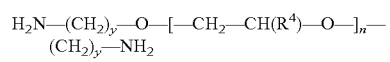

in which y=2 or 3, $R^4$ is a hydrogen atom or an alkyl group of 1 to 2 carbon atoms and n is an integer ranging from 0 to 3, such that the primary alkalinity ranges from 0.4 to 34 meq/g, more preferably from 3.0 to 34 meq/g; such polyetherdiamines are sold, for example, under the names Jeffamine EDR-148 and Jeffamine EDR-176 by Huntsman and exhibit respective primary alkalinities of 13.51 and 11.36 meq/g;

dimeric and trimeric fatty amines comprising two or three primary amine groups with a primary alkalinity ranging from 3.39 meq/g to 3.60 meq/g. These dimeric and trimeric fatty amines can be obtained from corresponding dimerized and trimerized fatty acids. Mention may be made, as examples of such dimeric fatty amines, of those corresponding to the following formulae:

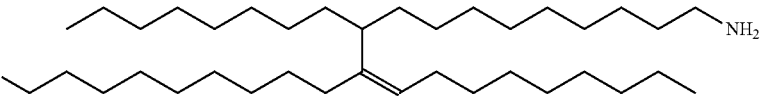

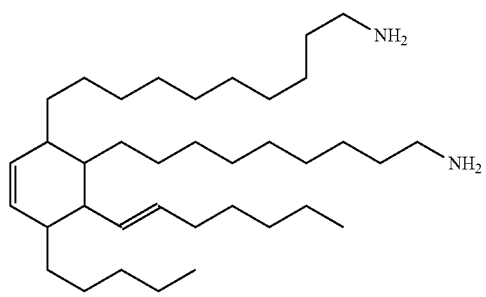

-continued

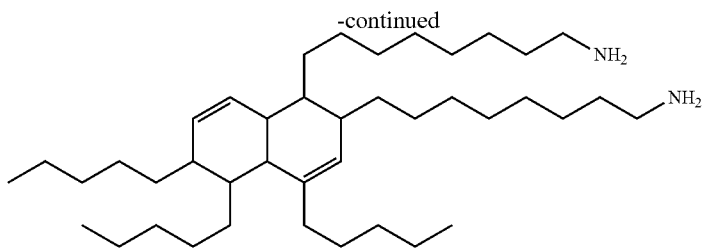

The dimeric and trimeric fatty acids used to prepare the abovementioned fatty amines are obtained by high-temperature polymerization under pressure of unsaturated fatty monocarboxylic acids (monomeric acid) comprising from 6 to 22 carbon atoms, preferably from 12 to 20 carbon atoms, and originate from plant or animal sources. Mention may be made, as examples of such unsaturated fatty acids, of $C_{18}$ acids having one or two double bonds (respectively oleic acid or linoleic acid) obtained from tall oil, which is a byproduct of the manufacture of paper pulp. After polymerization of these unsaturated fatty acids, an industrial mixture is obtained which contains, on average, 30-35% by weight of fatty monocarboxylic acids, often isomerized, with respect to the starting unsaturated fatty monocarboxylic acids, 60-65% by weight of dicarboxylic acids (dimeric acids) comprising twice the carbon number with respect to the starting unsaturated fatty monocarboxylic acids, and 5-10% by weight of tricarboxylic acids (trimeric acids) having three times the carbon number, with respect to the starting unsaturated fatty monocarboxylic acids. The different commercial grades of dimeric, monomeric or trimeric acids are obtained by purification of this mixture. These dimeric and trimeric fatty acids are subsequently subjected to a reductive ammoniation ($NH_3/H_2$) reaction in the presence of a catalyst, making it possible to obtain the dimerized fatty amines.

Advantageously, the primary amine —$NH_2$ groups of the aminated curing agents (B1) which can be used according to the invention cited in the preceding sections are methyleneamine (—$CH_2$—$NH_2$) groups.

When the multicomponent system according to the invention comprises at least two aminated curing agents (B1), the latter can be included in two different components, for example a component (B) and a component (C). The components (A), (B) and (C) are then stored separately before mixing at the time of the use of said system, at a mixing temperature T3, in order to form an adhesive composition intended to be applied to the surface of a material.

The multicomponent system according to the invention can comprise at least one crosslinking catalyst.

The crosslinking catalyst(s) can be any catalyst generally used to accelerate the ring-opening reaction of a compound comprising a cyclocarbonate (2-oxo-1,3-dioxolan-4-yl) methyl carbamate group by a primary amine.

Mention may be made, as examples of crosslinking catalysts which can be used according to the invention, of:

- alkoxides, such as potassium tert-butoxide or sodium methoxide;
- strong bases chosen from:
  - phosphazenes, such as 2-(tert-butylimino)-2-diethylamino-1,3-dimethylperhydro-1,3,2-diazaphosphorine (BMEP), guanidines, such as:

1,5,7-triazabicyclo[4.4.0]dec-5-ene (TBD)

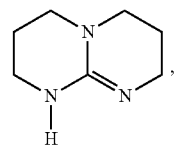

N-methyltriazabicyclodecene (Me-TBD)

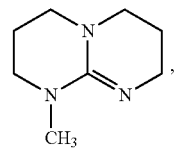

tertiary amines, such as:

1,8-diazabicyclo[5.4.0]undec-7-ene (DBU)

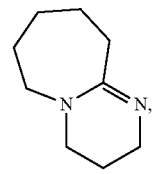 [SMILES: C1CCC2=NCCCN2CC1]

1,5-diazabicyclo[4.3.0]non-5-ene (DBN)

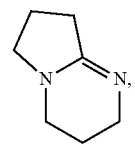

2,2'-dimorpholinodiethyl ether (DMDEE)

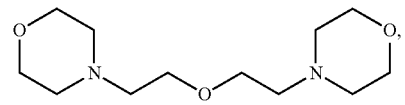 [SMILES: C1CN(CCOCCN2CCOCC2)CCO1]

1,4-diazabicyclo[2.2.2]octane (DABCO)

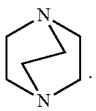

An amount ranging from 0.05 to 1% by weight of crosslinking catalyst(s), with respect to the total weight of the multicomponent system according to the invention, can be used.

The crosslinking catalyst(s) can be distributed in one or more of the components forming the multicomponent system according to the invention.

Advantageously, the multicomponent system according to the invention can comprise at least one inorganic filler.

The inorganic filler(s) which can be used is (are) chosen so as to improve the mechanical performance of the composition according to the invention in the crosslinked state.

Mention may be made, as examples of filler(s) which can be used, without implied limitation, of calcium carbonate, kaolin, silica, gypsum, microspheres and clays.

Preferably, the inorganic filler(s) has (have) a maximum particle size, in particular an external diameter, of less than 100 μm and preferably of less than 10 μm. Such fillers can be selected, in a way well known to a person skilled in the art, by using sieves having appropriate meshes.

Preferably, the total content of filler(s) optionally present in the multicomponent system according to the invention does not exceed 70% by weight of the total weight of said system.

The filler(s) can be distributed in one or more of the components forming the multicomponent system according to the invention.

The multicomponent system according to the invention can include less than 2% by weight of one or more additives appropriately chosen in order not to damage the properties of the adhesive composition according to the invention in the crosslinked state. Mention may be made, among the additives which can be used, of UV (ultraviolet) stabilizers or antioxidants, pigments and dyes. These additives are preferably chosen from those generally used in adhesive compositions.

The additive(s) can be distributed in one or more of the components forming the multicomponent system according to the invention.

As a result of the low viscosity of the polyurethane prepolymer having cyclocarbonate end groups (PP2) according to the invention, the multicomponent system according to the invention can be employed directly by mixing its different components, without addition of solvent and/or plasticizer, viscosity reducers, to the component (A) and/or without heating said component to temperatures above 95° C.

Preferably, the polyurethane prepolymer having cyclocarbonate end groups (PP2) according to the invention has a viscosity, measured at 23° C., of less than or equal to 600 Pa·s and a viscosity, measured at 60° C., of less than or equal to 40 Pa·s, allowing the multicomponent system according to the invention to be advantageously used without addition of solvent and/or of plasticizer to the component (A) comprising said prepolymer (PP2) and/or without heating said component.

The multicomponent system according to the invention thus advantageously comprises:
  as first component (A), a composition comprising at least one polyurethane prepolymer having cyclocarbonate end groups (PP2) according to the invention and
  as second component (B), a composition comprising at least one or two aminated curing agent(s) as described in one of the preceding sections (B1), and
  does not comprise solvent and/or plasticizer.

The multicomponent system according to the invention can be a two-component system, that is to say a system consisting of two components (A) and (B), said components (A) and (B) being as described in one of the preceding sections.

In each of the preceding sections, the distribution and the total content of crosslinking catalyst(s), inorganic filler(s) and/or additive(s) optionally present in the multicomponent system are chosen so as not to affect the conditions of mixing of the different components of said system.

Preferably, the component (A) comprises at least 97% by weight and more preferably at least 98% by weight of polyurethane prepolymer(s) having cyclocarbonate end groups (PP2) according to the invention.

The invention also relates to the use of a polyurethane prepolymer having cyclocarbonate end groups (PP2) according to the invention in the manufacture of an adhesive (bonding or mastic) composition, preferably a solvent-free adhesive composition, in particular in the form of a multicomponent system.

In particular, the polyurethane prepolymer having cyclocarbonate end groups (PP2) according to the invention is reacted with at least one aminated curing agent (B1) as described above to form, by a polyaddition reaction, a composition comprising at least one poly(hydroxyurethane-urethane) comprising at least two, preferably two or three, primary amine groups. The amounts of polyurethane prepolymer having cyclocarbonate end groups (PP2) and of aminated curing agent (B1) used in order to obtain such a poly(hydroxyurethane-urethane) are such that the molar ratio r3 preferably ranges from 0.5 to 1 and more preferably from 0.8 to 1.

Preferably, the adhesive composition is manufactured without addition of compound intended to lower the viscosity of said composition, such as a solvent (aqueous, organic), a reactive diluent and/or a plasticizer.

Preferably, the components of the multicomponent system according to the invention comprising the compound(s) (PP2) according to the invention and the aminated curing agent(s) (B1) according to the invention are mixed at a temperature T3 as defined above.

Preferably, the adhesive composition according to the invention is manufactured by the use of the multicomponent system according to the invention, that is to say the mixing of the different components constituting it, at a mixing temperature T3.

Another subject matter of the invention is a process for assembling materials employing the polyurethane prepolymer having cyclocarbonate end groups (PP2) according to the invention, in particular via the use of the multicomponent system according to the invention, comprising the following stages:
  the mixing of at least one polyurethane prepolymer having cyclocarbonate end groups (PP2) as described above and of at least one curing agent having at least two primary amine groups (B1) as described above, then the coating of said mixture onto the surface of a first material, then the laminating of the surface of a second material onto said coated surface, then the crosslinking of said mixture.

The stage of mixing at least one polyurethane prepolymer having cyclocarbonate end groups (PP2) as described above and of at least one aminated curing agent (B1) as described above can be carried out in particular by the use of the multicomponent system according to the invention, namely by mixing the components respectively comprising the polyurethane prepolymer(s) having cyclocarbonate end groups (PP2) (component (A)) and the aminated curing agent(s) (component (B)), as are defined above.

This mixing stage can be carried out at ambient temperature or under hot conditions, before coating.

Preferably, the mixing is carried out at a temperature lower than the decomposition temperature of the ingredients included in one or other of the components (A) and (B). In particular, the mixing is carried out at a temperature T3 of less than 95° C., preferably ranging from 15 to 80° C., in order to avoid any thermal decomposition.

Preferably, the polyurethane prepolymer having cyclocarbonate end groups (PP2) and the aminated curing agent(s) (B1) are mixed in amounts such that the molar ratio r3 of the number of cyclocarbonate groups to the number of primary amine groups present in the mixture ranges from 0.5 to 1 and more preferably from 0.8 to 1.

In each of these alternative forms, the coating of said mixture can be carried out over all or part of the surface of a material. In particular, the coating of said mixture can be carried out in the form of a layer with a thickness ranging from 0.002 to 5 mm.

Optionally, the crosslinking of said mixture on the surface of the material can be accelerated by heating the coated material(s) to a temperature of less than or equal to 120° C. The time required in order to complete this crosslinking reaction and to thus ensure the required level of cohesion is generally of the order of 0.5 to 24 hours.

The coating and the laminating of the second material are generally carried out within a time interval compatible with the coating process, as is well known to a person skilled in the art, that is to say before the adhesive layer loses its ability to fix the two materials by adhesive bonding.

The appropriate materials are, for example, inorganic substrates, such as glass, ceramics, concrete, metals or alloys (such as aluminum alloys, steel, nonferrous metals and galvanized metals), and also metals and composites which are optionally coated with paint (as in the motor vehicle field); or else organic substrates, such as wood, or plastics, such as PVC, polycarbonate, PMMA, epoxy resins and polyesters.

The mechanical performances and the adhesiveness of the adhesive compositions according to the invention can be measured in accordance with the tests described in the examples which follow, namely once crosslinked. The adhesive compositions according to the invention are suited to a broad panel of applications, such as the food processing industry, cosmetics, hygiene, transportation, housing, textiles or packaging. In particular, the adhesive compositions according to the invention exhibit an intrinsic elongation at break force ranging from 0.3 to 10 MPa, as illustrated in the examples (measurement of the mechanical performances).

The following examples are given purely by way of illustration of the invention and should not be interpreted in order to limit the scope thereof.

A—Synthesis of the Polyurethane Prepolymer Having Cyclocarbonate End Groups (PP2) (Component A)

The components (A) of examples 1 to 3 according to the invention are prepared using the reactants shown in table 1 and according to the procedure described in the following pages. The amounts shown in table 1 are expressed in grams of commercial products.

TABLE 1

| Ingredients | 1 | 2 | 3 |
| --- | --- | --- | --- |
| Hexamethylene diisocyanate (HDI) allophanate derivative of formula (I) | 73.3 | 72.4 | 34.8 |
| PPG diol | — | — | 58.8 |
| Reaction catalyst | 0.1 | 0.1 | 0.1 |
| NCO/OH ratio, r1 | N.A. | N.A. | 1.89 |
| Glycerol carbonate | 26.6 | 27.5 | 6.3 |
| NCO/OH molar ratio, r2 | 0.97 | 0.93 | 0.91 |

N.A.: not applicable

In table 1, use is made, as:

hexamethylene diisocyanate (HDI) allophanate derivative of formula (I), of the commercial product sold under the name Tolonate® X FLO by Vencorex, corresponding to a composition comprising a minimum of 99.5% by weight of hexamethylene diisocyanate (HDI) allophanate derivative of formula (I) and less than 0.5% by weight of HDI, and having a content of NCO groups equal to 13.4% by weight, with respect to the weight of Tolonate® X FLO, PPG diol, of the commercial product sold under the name Voranol® P2000 by Dow, corresponding to polypropylene glycol diol having a hydroxyl number approximately equal to 56 mg KOH/g of PPG diol, reaction catalyst, of the commercial product sold under the name Borchikat® 315 by OM Group, corresponding to a bismuth neodecanoate reaction catalyst, glycerol carbonate, of the commercial product sold under the name Jeffsol® GC by Huntsman, corresponding to a composition comprising a minimum of 96% by weight of glycerol carbonate and a maximum of less than 3% by weight of glycerol, and having a hydroxyl number approximately equal to 505 mg KOH/g of composition.

The molar ratios r1 and r2 are calculated in a way well known to a person skilled in the art from the molar amounts of reactants used. By expressing the number of mole(s) of derivative of formula (I) used as a function of the content of NCO groups (% NCO) of the latter and of the molar mass of NCO equal to 42 g/mol; the number of mole(s) of polyether polyol used as a function of the hydroxyl number (mg KOH/g) of the latter and of the molar mass of KOH equal to 56 g/mol; and the number of mole(s) of glycerol carbonate used as a function of the hydroxyl number (mg KOH/g) of the latter and of the molar mass of KOH equal to 56 g/mol, it is possible to write:

$$r1 = \frac{\% \text{ NCO (derivative of formula } (I)) \times w1 \text{ (derivative of formula } (I)) \times 10 \times 56}{42 \times OHN \text{ (polyether polyol)} \times w2 \text{ (polyether polyol)}}$$

and $$r2 = \frac{\left(\dfrac{[\% \text{ NCO (derivative of formula } (I)) \times w1 \text{ (derivative of formula } (I)) \times 10]}{42} - \dfrac{[OHN \text{ (polyether polyol)} \times w2 \text{ (polyether polyol)}]}{56}\right)}{(OHN \text{ (glycerol carbonate)} \times w3 \text{ (glycerol carbonate)})} \times 56$$

where:

% NCO (derivative of formula (I)) corresponds to the content of NCO groups of the Tolonate® X FLO, w1 (derivative of formula (I)) corresponds to the weight of Tolonate® X introduced, OHN (polyether polyol) corresponds to the hydroxyl number of the Voranol® P2000, w2 (polyether polyol) corresponds to the weight of Voranol® P2000 introduced, OHN (glycerol carbonate) corresponds to the hydroxyl number of the Jeffsol® GC, w3 (glycerol carbonate) corresponds to the weight of Jeffsol® GC introduced.

EXAMPLES 1 AND 2: SYNTHESIS OF THE POLYURETHANE PREPOLYMER HAVING CYCLOCARBONATE END GROUPS (PP2) (COMPONENT A) IN ONE STAGE (E2)

The diisocyanate is heated to 50° C. in a reactor placed under a nitrogen atmosphere and then the glycerol carbonate is introduced in the proportions shown in table 1. The mixture is subsequently brought to 80° C. and the catalyst is added. This mixture is kept continuously stirred at 80° C., under nitrogen, until complete disappearance of the NCO functional groups visible in the infrared (IR) (approximately 2250 cm$^{-1}$).

100 g of prepolymer (PP2) (component A) are obtained at the end of the reaction for each of the examples.

EXAMPLE 3: SYNTHESIS OF THE POLYURETHANE PREPOLYMER HAVING CYCLOCARBONATE END GROUPS (PP2) (COMPONENT A) IN TWO STAGES (E1 AND E2)

Stage E1: Synthesis of the Compound (PP1)

The diisocyanate is heated to 50° C. in a reactor placed under a nitrogen atmosphere and then a mixture of polyether polyol and of reaction catalyst, in accordance with the amounts shown in table 1, is introduced dropwise with continuous stirring. The temperature does not exceed 80° C.

This mixture is kept continuously stirred at 80° C., under nitrogen, until the NCO functional groups of the diisocyanate have completely reacted.

The reaction is monitored by measuring the change in the content of NCO groups in the mixture, for example by back titration of dibutylamine using hydrochloric acid, according to the standard NF T52-132. The reaction is halted when the "degree of NCO" (% NCO) measured is approximately equal to the desired degree of NCO (2.2% by weight of the weight of the reaction mixture).

Stage E2: Synthesis of the Polyurethane Prepolymer Having Cyclocarbonate End Groups (PP2) (Component A)

Once the reaction of stage E1 is complete, the glycerol carbonate is introduced into the reactor in the proportion shown in table 1, with stirring and under nitrogen. The temperature does not exceed 80° C.

The compound (PP1)/glycerol carbonate mixture is kept continuously stirred at 80° C. under nitrogen until complete disappearance of the NCO functional groups visible in the infrared (IR) (approximately 2250 cm$^{-1}$).

100 g of prepolymer (PP2) (component A) are obtained at the end of the reaction.

Viscosity Measurement:

The viscosity of the component (A) obtained is measured 24 hours after the end of the reaction (D+1) at 23° C. and 60° C. and is expressed in pascal·seconds (Pa·s). All of the values measured for examples 1 to 3 are combined in the following table 2.

The viscosity measurement at 23° C. is carried out using a Brookfield RVT viscometer, with a spindle suited to the viscosity range and at a rotational speed of 20 revolutions per minute (rev/min).

The viscosity measurement at 60° C. is carried out using a Brookfield RVT viscometer coupled with a heating module of Thermosel type of the Brookfield brand, with a spindle suited to the viscosity range and at a rotational speed of 20 revolutions per minute.

TABLE 2

| Characterization of the polyurethane prepolymer having cyclocarbonate end groups (PP2) | 1 | 2 | 3 |
|---|---|---|---|
| Viscosity at D + 1 at 23° C. (Pa · s) | 300 | 300 | 110 |
| Viscosity at D + 1 at 60° C. (Pa · s) | 3.6 | 3.6 | 6.7 |
| Calculated content of cyclocarbonate groups in the prepolymer (PP2) (meq/g of prepolymer (PP2)), denoted t$_{cc}$ (PP2) | 2.40 | 2.48 | 0.57 |

The content of cyclocarbonate groups in the prepolymer (PP2) (denoted t$_{cc}$ (PP2)) (expressed in meq/g of prepolymer (PP2)) is calculated in a way well known to a person skilled in the art from the molar amount of glycerol carbonate used. By expressing the number of mole(s) of glycerol carbonate used as a function of the hydroxyl number (mg KOH/g) of the latter and of the molar mass of KOH equal to 56 g/mol, it is possible to write:

$$t_{cc} \text{ (PP2)} = \frac{OHN \text{ (glyercol carbonate)} \times w3 \text{ (glycerol carbonate)}}{56 \times w \text{ (PP2)}}$$

where:
OHN (glycerol carbonate) corresponds to the hydroxyl number of the Jeffsol® GC,
w3 (glycerol carbonate) corresponds to the weight of Jeffsol® GC introduced,
w (PP2) corresponds to the weight of prepolymer (PP2), i.e. to the total weight of the ingredients used for the synthesis of the prepolymer PP2 (derivative of formula (I), PPG diol, reaction catalyst).

B—Preparation of the Compositions According to the Invention by Mixing the Components A and B The adhesive compositions 1' to 12' according to the invention are prepared by mixing the different ingredients shown in the following table 3, at a temperature T3 as shown below, under a nitrogen atmosphere. The mixture is kept continuously stirred under vacuum (for debubbling) for 2 minutes. The mixture is then left stirring until complete disappearance of the cyclocarbonate functional groups visible in the infrared (signal at 1800 cm$^{-1}$).

The amounts shown in table 3 are expressed in grams.

where:
$t_{cc}$ is the calculated content of cyclocarbonate groups in the prepolymer (PP2) (meq/g) as defined above,
w (PP2) corresponds to the weight of prepolymer (PP2) as defined above,
$PA_k$ is the primary alkalinity of each aminated curing agent,
$w_k$ (aminated curing agent) corresponds to the weight of each aminated curing agent k with alkalinity $PA_k$ used,
$\Sigma_k[w_k$ (aminated curing agent)$\times PA_k$ (aminated curing agent)] corresponds, for k=1, to the product of the weight of the aminated curing agent used and the primary alkalinity of said aminated curing agent and, for k>1, to the sum of the products of the weight of each aminated curing agent used and their respective primary alkalinity.
k is an integer greater than or equal to 1.

Measurement of the Mechanical Performances: Breaking Strength and Elongation at Break of the Compositions According to the Invention in the Crosslinked State.

Once crosslinked, the breaking strength and the elongation at break are measured by a tensile test on the adhesive composition according to the protocol described below.

TABLE 3

|  | 1' | 2' | 3' | 4' | 5' | 6' | 7' | 8' | 9' | 10' | 11' | 12' |
|---|---|---|---|---|---|---|---|---|---|---|---|---|
| Component A of example 1 | 100 | 100 | 100 | 100 | 100 | 100 | 100 | 100 | 100 | — | — | — |
| Component A of example 2 | — | — | — | — | — | — | — | — | — | 100 | 100 | — |
| Component A of example 3 | — | — | — | — | — | — | — | — | — | — | — | 100 |
| TAEA | 12.2 | 12.2 | 12.2 | 12.2 | 12.2 | 12.2 | 6 | 6 | 6 | — | — | 2.85 |
| HMDA | — | — | — | — | — | — | — | 12 | — | — | — | — |
| PEI | — | — | — | — | — | — | — | — | — | 35.2 | 35.2 | — |
| Dimeric fatty amine | — | — | — | — | — | — | 35 | — | 35 | — | — | — |
| Calcium carbonate | — | — | 50 | 100 | 100 | 100 | 100 | — | — | 100 | 50 | 100 |
| Molar ratio r3 | 0.96 | 0.96 | 0.96 | 0.96 | 0.96 | 0.96 | 0.96 | 0.73 | 0.96 | 0.93 | 0.93 | 0.97 |
| Temperature T3 (° C.) | 23 | 80 | 80 | 80 | 80 | 80 | 80 | 80 | 80 | 80 | 80 | 80 |

The following are used in table 3:
tris(2-aminoethyl)amine (TAEA) with a primary alkalinity=20.52 meq/g of TAEA,
hexamethylenediamine (HMDA) with a primary alkalinity=17.21 meq/g of HMDA,
polyethyleneimine (PEI), sold under the name E100 by Huntsman, with a primary alkalinity=7.58 meq/g of PEI,
dimeric fatty amine, sold under the name Priamine® 1071 by Croda, with a primary alkalinity=3.65 meq/g of Priamine,
calcium carbonate with a maximum particle size=100 μm.

The molar ratio r3 is calculated in a way well known to a person skilled in the art from the molar amounts of glycerol carbonate and of curing agent(s) having at least two primary amine (—NH$_2$) groups. By expressing the number of mole(s) of glycerol carbonate as a function of the content of cyclocarbonate groups in the prepolymer (PP2) calculated above and the number of mole(s) of aminated curing agent(s) used as a function of the primary alkalinity (meq/g) of the latter, it is possible to write:

$$r3 = \frac{t_{cc}\,(PP2) \times w\,(PP2)}{\sum_k [w_k\,(\text{aminated curing agent}) \times PA_k\,(\text{aminated curing agent})]}$$

The principle of the measurement consists in drawing, in a tensile testing device, the movable jaw of which is displaced at a constant rate equal to 100 mm/minute, a standard test specimen consisting of the crosslinked adhesive composition and in recording, at the moment when the test specimen breaks, the applied tensile stress (in MPa) and also the elongation of the test specimen (as %).

The standard test specimen has the shape of a dumbbell, as illustrated in the international standard ISO 37. The narrow part of the dumbbell used has a length of 20 mm, a width of 4 mm and a thickness of 500 μm.

In order to prepare the dumbbell, the conditioned composition as described above is heated to 95° C. and then the amount necessary to form, on an A4 sheet of silicone-treated paper, a film having a thickness of 500 μm is extruded over this sheet, which film is left at 23° C. and 50% relative humidity for 7 days for crosslinking. The dumbbell is then obtained by simple cutting from the crosslinked film using a hollow punch.

The tensile strength test is repeated twice and gives the same results. The applied tensile stress recorded is expressed in megapascals (MPa, i.e. 10$^6$ Pa) and the elongation at break is expressed as % with respect to the initial length of the test specimen. The values are combined in table 4 below.

TABLE 4

|  | 1' | 2' | 3' | 4' | 5' | 6' | 7' | 8' | 9' | 10' | 11' | 12' |
| --- | --- | --- | --- | --- | --- | --- | --- | --- | --- | --- | --- | --- |
| Applied tensile stress (MPa) | 2.4 | 4.6 | 5.5 | 6.9 | 3.4 | 4.1 | 4 | 1.6 | 1.4 | 3.2 | 4.5 | 4.9 |
| Elongation at break (%) | 360 | 533 | 270 | 200 | 200 | 280 | 600 | 750 | 410 | 435 | 615 | 1230 |

Adhesiveness: Measurement of the Force of Shearing Under Stress (Lap Shear)

Compositions 1', 2' and 8' according to the invention were furthermore subjected to tests of adhesive bonding of two small plates made of powdered aluminum (each with a size of 100 mm×25 mm) cleaned beforehand with a solvent (isopropanol). The adhesive composition is applied to one of the surfaces of the small plates using a spatula, within a space delimited by a Teflon window of 12.5 mm×25 mm. The other small plate is affixed over the adhesive-coated surface by pressing the two small plates against one another. After crosslinking at 23° C. and 50% relative humidity for seven days, the shear force at failure and also the failure facies are measured.

TABLE 5

|  | 1' | 2' | 8' |
| --- | --- | --- | --- |
| Shear force at failure (MPa) | 2.3 | 4 | 0.6 |
| Type of failure | AF | AF | AF |

"AF" denotes adhesive failure, meaning that it is observed that all of the adhesive seal has remained adhesively bonded to one of the faces of the laminated small plates.

Thus, the adhesive compositions according to the invention can be easily formulated using a preparation process which is relatively inexpensive in energy, which is friendly to man and to his environment and which does not employ solvent or plasticizer.

In addition, the adhesive compositions according to the invention thus obtained result in adhesives which are effective in terms of mechanical properties and/or of adhesive force and which are suitable for a broad panel of applications.

The invention claimed is:

1. A process for the preparation of a polyurethane prepolymer having (2-oxo-1,3-dioxolan-4-yl)methyl carbamate end groups (PP2) comprising a stage of polyaddition reaction (denoted E2):
   of at least one compound (PP1) having at least two NCO groups and at least one divalent unit of formula (I'):

$$\left[ \begin{array}{c} R \!-\!\!\left[ OR^3 \right]_q \!-\! O \!\!\diagdown\!\! \diagup\!\! O \\ \phantom{xxxxx} \diagdown\!\!\diagup \phantom{xx} H \\ \phantom{xxx} N \phantom{xxx} N \\ -\!(CH_2)_6 \phantom{xx} (CH_2)_6\!-\! \\ \phantom{xxxxxxx} \diagdown\!\!\diagup \\ \phantom{xxxxxxxx} O \end{array} \right]_p \quad (I')$$

in which:
   p is an integer ranging from 1 to 2;
   q is an integer ranging from 0 to 9;
   R represents a saturated or unsaturated, linear or branched, cyclic or acyclic, hydrocarbon chain of 1 to 20 carbon atoms;
   $R^3$ represents a saturated, linear or branched, divalent hydrocarbon group of 2 to 4 carbon atoms;
   with at least one glycerol carbonate, at a reaction temperature T2 of less than 95° C., under anhydrous conditions, in amounts of compound (PP1) and of glycerol carbonate resulting in an NCO/OH molar ratio, denoted r2, ranging from 0.8 to 1.0.

2. The preparation process as claimed in claim 1, wherein the compound(s) (PP1) is (are) hexamethylene diisocyanate (HDI) allophanate compounds of formula (I):

$$OCN \!-\! \left[ \begin{array}{c} R \!-\!\!\left[ OR^3 \right]_q \!-\! O \!\!\diagdown\!\! \diagup\!\! O \\ \phantom{xxxxx} \diagdown\!\!\diagup \phantom{xx} H \\ \phantom{xxx} N \phantom{xxx} N \\ -\!(CH_2)_6 \phantom{xx} (CH_2)_6\!-\! \\ \phantom{xxxxxxx} \diagdown\!\!\diagup \\ \phantom{xxxxxxxx} O \end{array} \right]_p \!-\! NCO \quad (I)$$

in which:
   p is an integer ranging from 1 to 2;
   q is an integer ranging from 0 to 9;
   R represents a saturated or unsaturated, linear or branched, cyclic or acyclic, hydrocarbon chain of 1 to 20 carbon atoms;
   $R^3$ represents a saturated, linear or branched, divalent hydrocarbon group having from 2 to 4 carbon atoms.

3. The preparation process as claimed in claim 1, wherein the compound(s) (PP1) is (are) polyurethane prepolymers having NCO end groups capable of being obtained by a polyaddition reaction:
   (i) of a diisocyanate composition comprising at least one hexamethylene diisocyanate (HDI) allophanate compound of formula (I), $$OCN \!-\! \left[ \begin{array}{c} R \!-\!\!\left[ OR^3 \right]_q \!-\! O \!\!\diagdown\!\! \diagup\!\! O \\ \phantom{xxxxx} \diagdown\!\!\diagup \phantom{xx} H \\ \phantom{xxx} N \phantom{xxx} N \\ -\!(CH_2)_6 \phantom{xx} (CH_2)_6\!-\! \\ \phantom{xxxxxxx} \diagdown\!\!\diagup \\ \phantom{xxxxxxxx} O \end{array} \right]_p \!-\! NCO \quad (I)$$

in which:
   p is an integer ranging from 1 to 2;
   q is an integer ranging from 0 to 9;
   R represents a saturated or unsaturated, linear or branched, cyclic or acyclic, hydrocarbon chain of 1 to 20 carbon atoms;
   $R^3$ represents a saturated, linear or branched, divalent hydrocarbon group having from 2 to 4 carbon atoms (ii) with at least one polyether polyol, at a reaction temperature T1 of less than 95° C., under anhydrous conditions and in amounts of diisocyanate(s) and of polyether polyol(s) resulting in an NCO/OH molar ratio, denoted r1, ranging from 1.6 to 1.9.

4. The preparation process as claimed in claim 3, wherein the polyether polyol(s) is (are) polyoxyalkylene polyols, a linear or branched alkylene part of which has 1 to 4 carbon atoms and the average molar mass of which ranges from 200 to 20 000 g/mol.

5. The preparation process as claimed in claim 1, that does not comprise adding one or more solvent(s) and/or plasticizer(s).

6. A polyurethane prepolymer having (2-oxo-1,3-dioxolan-4-yl)methyl carbamate end groups (PP2), capable of being obtained by the preparation process as defined in claim 1.

7. A multicomponent system, comprising:
  as first component (denoted component (A)), a composition comprising at least one polyurethane prepolymer having (2-oxo-1,3-dioxolan-4-yl)methyl carbamate end groups (PP2), as defined in claim 6, and
  as second component (denoted component (B)), a composition comprising at least one curing agent having at least two primary amine (—NH$_2$) groups (B1).

8. The multicomponent system as claimed in claim 7, wherein the primary amine groups of said curing agent(s) (B1) are methylene(primary amine) (—CH$_2$—NH$_2$) groups.

9. The multicomponent system as claimed in claim 7, wherein the amounts of polyurethane prepolymer(s) having (2-oxo-1,3-dioxolan-4-yl)methyl carbamate end groups (PP2) and of curing agent(s) having at least two primary amine groups (B1) as defined in claim 7 present in the multicomponent system result in a molar ratio of the number of cyclocarbonate groups to the number of primary amine groups, denoted r3, ranging from 0.5 to 1.

10. The multicomponent system as claimed in claim 7, comprising at least one inorganic filler.

11. A process for assembling materials employing the polyurethane prepolymer having (2-oxo-1,3-dioxolan-4-yl)methyl carbamate end groups (PP2) as defined in claim 6, comprising:
  mixing of at least one polyurethane prepolymer having (2-oxo-1,3-dioxolan-4-yl)methyl carbamate end groups (PP2) and of at least one curing agent having at least two primary amine (—NH$_2$) groups (B1), then
  coating of said mixture onto the surface of a first material, then
  laminating of the surface of a second material onto said coated surface, then
  crosslinking of said mixture.

12. In an adhesive composition comprising a polyurethane polymer, the improvement wherein the polymer is produced from a polyurethane prepolymer having (2-oxo-1,3-dioxolan-4-yl)methyl carbamate end groups (PP2) as defined in claim 6.

* * * * *